United States Patent [19]

Brenner

[11] Patent Number: 5,048,803
[45] Date of Patent: Sep. 17, 1991

[54] HYDRAULICALLY DAMPING BEARING

[75] Inventor: Heinrich Brenner, Ahrweiler, Fed. Rep. of Germany

[73] Assignee: Boge AG, Eitorf, Fed. Rep. of Germany

[21] Appl. No.: 442,159

[22] Filed: Nov. 28, 1989

Related U.S. Application Data

[63] Continuation-in-part of Ser. No. 328,466, Mar. 24, 1989.

[30] Foreign Application Priority Data

Dec. 7, 1988 [DE] Fed. Rep. of Germany ....... 3841193

[51] Int. Cl.⁵ .............................................. F16F 13/00
[52] U.S. Cl. ................... 267/140.1; 267/141.6; 267/219
[58] Field of Search ............... 267/140.1 R, 140.1 C, 267/140.1 D, 219, 35, 141.6; 248/562, 638

[56] References Cited

U.S. PATENT DOCUMENTS

| | | | |
|---|---|---|---|
| 2,562,195 | 7/1951 | Lee | 248/358 |
| 4,215,842 | 8/1980 | Brenner et al. | 248/562 |
| 4,244,240 | 1/1981 | Rabenhorst | 74/572 |
| 4,288,063 | 9/1981 | Brenner et al. | 267/8 R |
| 4,424,961 | 1/1984 | Takei | 267/64.27 |
| 4,690,389 | 9/1987 | West | 267/140.1 |
| 4,708,329 | 11/1987 | Tabata et al. | 267/219 X |
| 4,721,291 | 1/1988 | Makibayashi et al. | 267/140.1 |
| 4,728,086 | 3/1988 | Ishiytama | 267/140.1 C |
| 4,753,421 | 6/1988 | Makibayashi et al. | 267/140.1 |
| 4,760,996 | 8/1988 | Davis | 267/122 |
| 4,781,361 | 11/1988 | Makibayashi et al. | 267/140.1 |
| 4,822,010 | 4/1989 | Thorn | 267/140.1 C |
| 4,861,005 | 9/1989 | Bausch | 267/140.1 C |

FOREIGN PATENT DOCUMENTS 0234966 12/1987 European Pat. Off.
3245653 6/1984 Fed. Rep. of Germany.
3810310 10/1989 Fed. Rep. of Germany.

Primary Examiner—Matthew C. Graham
Attorney, Agent, or Firm—Nils H. Ljungman & Associates

[57] ABSTRACT

A hydraulically dampening bearing which has an internal tube, an external tube and a rubber, or elastomeric, spring inserted between them. Chambers containing dampening fluid are hydraulically connected with one another via throttled passages. An equalizing chamber is connected to at least one of the chambers by a connecting line. The equalizing chamber is subdivided by an equalizing membrane into a first subchamber with dampening fluid and a second subchamber which receives a fluid pressure from an external source.

22 Claims, 5 Drawing Sheets

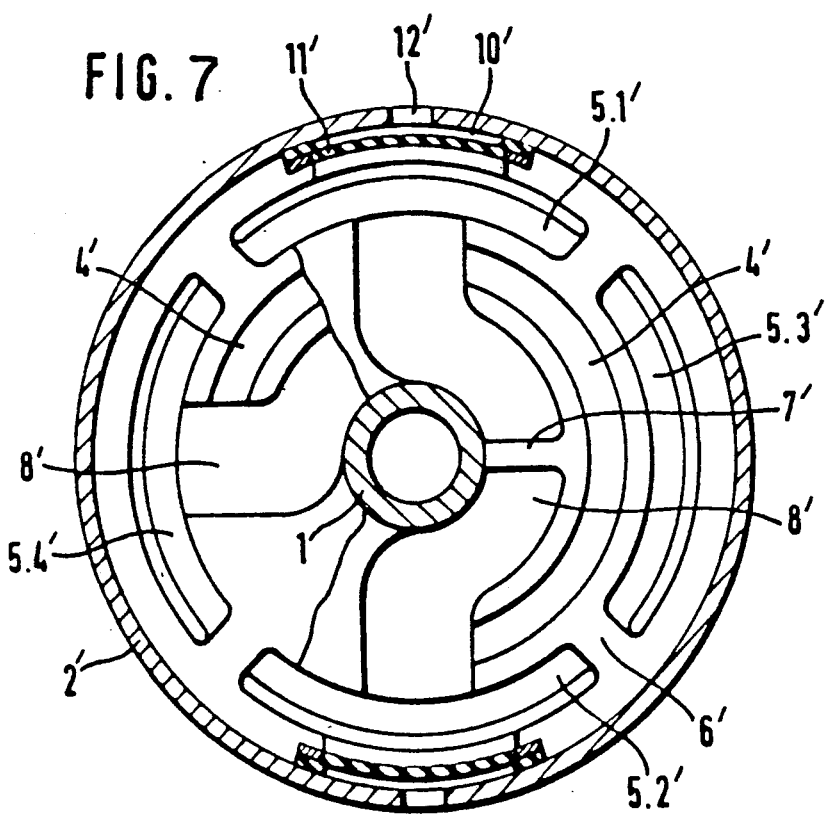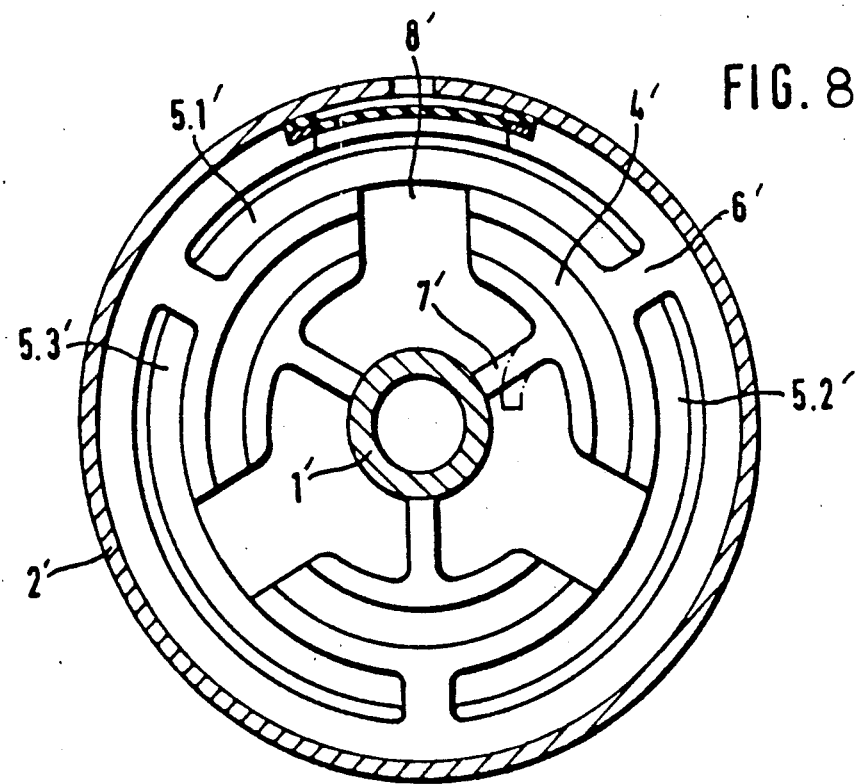

HYDRAULICALLY DAMPING BEARING

CROSS-REFERENCE TO RELATED APPLICATION

The present application is a continuation-in-part of U.S. patent application Ser. No. 07/328,466, entitled "HYDRAULIC DAMPING ELASTIC BEARING" filed Mar. 24, 1989.

BACKGROUND OF THE INVENTION

1. Field of the Invention

This invention relates to a hydraulically dampening bearing which has an internal tube, an external tube located at some distance from the internal tube, and a spring, or biasing means, inserted between the internal and external tubes. The bearing has sealed chambers filled with dampening fluid. The chambers are connected hydraulically to one another by means of throttle passages With this configuration, the spring, or biasing means, acts simultaneously as a load spring and sealing element.

2. Description of the Prior Art

German Patent Publication No. P 38 10 310.9, discloses a hydraulically dampening rubber bearing for uncoupling high frequency low amplitude, oscillations by means of the chambers. The bearing employs a recess which is sealed by a balancing membrane. However, it has been shown that during an increase in temperature of the bearing, the effectiveness of the dampening decreases. This disadvantage comes about through the temperature expansion of the dampening fluid and the rubber portion of the bearing. The expansion develops a pressure greater than atmospheric pressure in the chambers. As a consequence of this elevated pressure, the balancing membrane moves against the outer wall of the bearing and, thereby, becomes ineffective.

OBJECT OF THE INVENTION

It is an object of the invention, therefore, to develop a hydraulic dampening rubber or elastomeric bearing in such a configuration that effective balancing is present under all operating conditions, especially when the bearing is heated, so that effective control of the balancing action, provided by the bearing, is possible, with such control being independent of existing operating temperatures.

SUMMARY OF THE INVENTION

The object of the invention is achieved through a bearing which has at least one chamber connected to an equalizing chamber. The equalizing chamber includes an equalizing membrane, a first subchamber which contains dampening fluid and a second subchamber which may be exposed to an external pressure.

With this embodiment, it is advantageous if the connecting line, which connects the chamber, or chambers, of the bearing with the equalizing chamber, is sized to accept the increased volume of the dampening fluid which is generated during temperature increases of the bearing, without increased pressure, thereby insuring the effectiveness of the balancing action performed. In this embodiment during temperature increases, the balancing performed by the bearing is always effective even with heat expansion of the fluid and the rubber or elastomer. This action is achieved because the pressure developed, which is above atmospheric pressure, and which would normally be produced in the hydraulic chambers, is collected by the equalizing chamber. Therefore, the walls, which balance the forces in the bearing, do not position themselves against the rigid outer walls of the bearing.

The length and diameter of the connecting line, which may be connected to the equalizing chamber, is chosen so that during pressure thrusts within the other chambers, there are no significant dampening or currents in the connecting line. Thus only a volume equalization occurs within a short period of time.

In another embodiment of the invention, the equalizing chamber is integrated with, and is a part of, a rubber, or elastomeric, bearing. In still a further embodiment of the invention, the equalizing chamber is a separate component part.

In still a further embodiment of the invention, the equalizing membrane can be impacted with above atmospheric pressure, below atmospheric pressure or atmospheric pressure. This flexibility allows for better control of the balancing action of the bearing.

If, for example, the equalizing membrane is impacted with below atmospheric pressure, then a small, partial amount of the dampening fluid will be drawn away from the hydraulic chambers, thereby creating a small, below atmospheric pressure and the balancing membrane of the chambers is separated a larger distance from the rigid, external tube of the bearing. This results in reduced dampening and an increase in the effectiveness of the balancing action. This configuration is beneficial in conjunction with a vehicle motor since, for example, during the starting process, the motor can oscillate freely without transferring large forces to the body of the vehicle.

If the equalizing membrane is impacted by above atmospheric pressure, then the dampening fluid is preloaded within, or transferred to, the hydraulic chambers and the distance between the balancing membrane and the external tube is reduced. The dampening is, thereby, increased while a simultaneous reduction or elimination of the balancing action occurs. This could be advantageous, for example, in a vehicle travelling on extremely bad roadways when the oscillating movements of the motor of the vehicle are to be restricted.

In another embodiment of the invention, the equalizing membrane is open towards the atmosphere.

The present invention provides a hydraulic dampening elastomeric bearing which includes an internal element, an external element for being disposed around at least a portion of the internal element and radially spaced therefrom, and a spring apparatus for being disposed between the internal element and the external element. The spring apparatus defines a cavity therein. Also provided is an equalizing chamber for varying the hydraulic pressure in the cavity. The equalizing chamber includes a first subchamber in fluid communication with the cavity apparatus, a second subchamber physically separated and fluidly sealed from the first subchamber, a sealing device for being positioned between the first subchamber and the second subchamber and for sealing the first subchamber from the second subchamber and an opening defined by the second subchamber for allowing fluid passage into and out of the second subchamber.

BRIEF DESCRIPTION OF THE DRAWINGS

The following Description of the Preferred Embodiments may be better understood when taken in conjunction with the appended drawings in which:

FIG. 7 is a cross-sectional view of a hydraulic dampening bearing of the invention, similar to that shown in FIG. 4, which includes a total of four chambers;

FIG. 8 is a cross-sectional view of a hydraulic dampening bearing of the invention of FIGS. 1 through 3, which includes three chambers;

DESCRIPTION OF THE PREFERRED EMBODIMENTS

Figure 1:
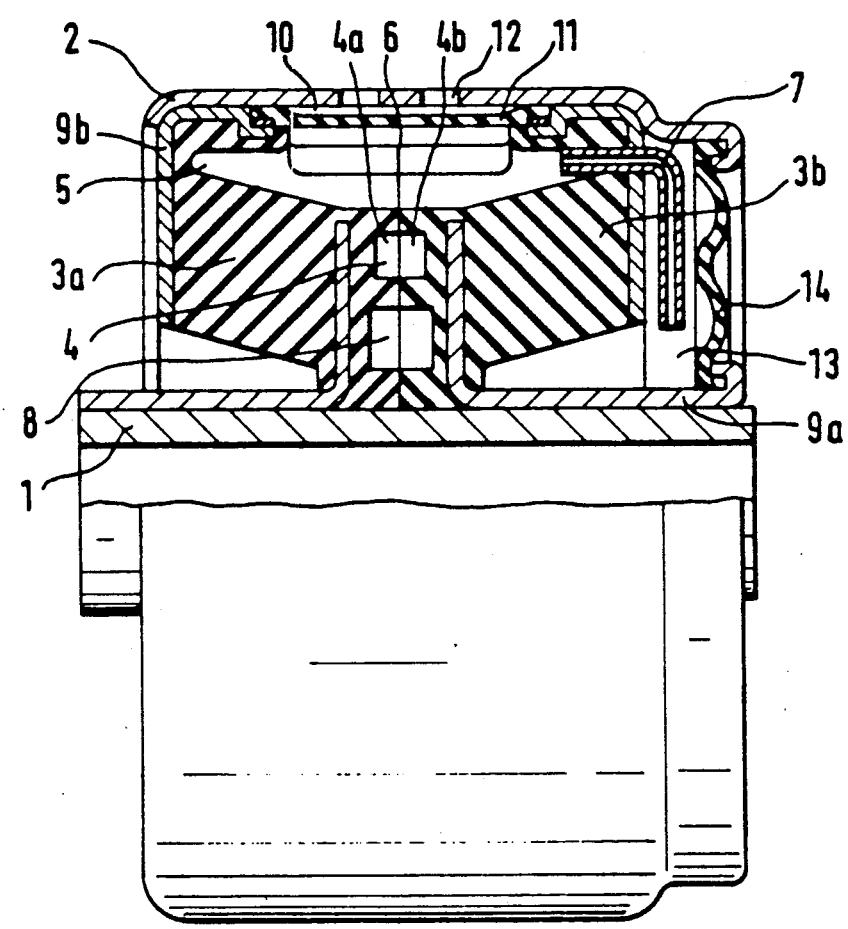
FIG. 1 is a side view, partially in section, of a hydraulic dampening bearing with an integral equalizing chamber.

The hydraulically dampening rubber, or elastomeric, bearing illustrated in FIG. 1 includes internal tube 1, external tube 2 which is located concentrically or eccentrically in relation to and at some distance from internal tube 1, and rubber, or elastomeric, spring 3 inserted between internal tube 1 and external tube 2. Chambers 5 are provided in the form of cavities in spring 3, and are filled with dampening fluid. Chambers 5 are hydraulically connected to one another by means of a throttle passage 4.

Spring 3 is composed of two, preferably, identical shear elements, 3a and 3b, whereby reinforcements 9a and 9b are included for increased efficiency of assembly of the bearing. Shear elements 3a and 3b have recesses 4a and 4b in facing surfaces 6. When the elements are assembled, the recesses form throttle passage 4, and bypass passage 8.

Connection line 7, starting in chamber 5, extends into equalizing chamber 13. Connection line 7 is sealed from the atmosphere by equalizing membrane 14. Equalizing chamber 13, together with equalizing membrane 14, insures that the additional volume of dampening fluid, generated in chamber 5 through the heating of spring 3 and the dampening fluid, can flow into equalizing chamber 13 without pressure. The inside diameter of connection line 7 is chosen to be small enough so that, during pressure surges, no significant dampening or fluid current is generated in connection line 7.

Chambers 5 are, additionally, equipped with recesses 10, balancing membrane 11 and venting bore 12 for the purpose of providing the balancing action of the bearing. For balancing during operation, the high frequency oscillations are compensated by balancing membrane 11 without any dampening by throttle passage 4. A balancing of this kind occurs only when balancing membrane 11 does not touch external tube 2 during the heating of the dampening fluid and spring 3, so that, under these circumstances, equalizing chamber 13 becomes operative.

Figure 2:
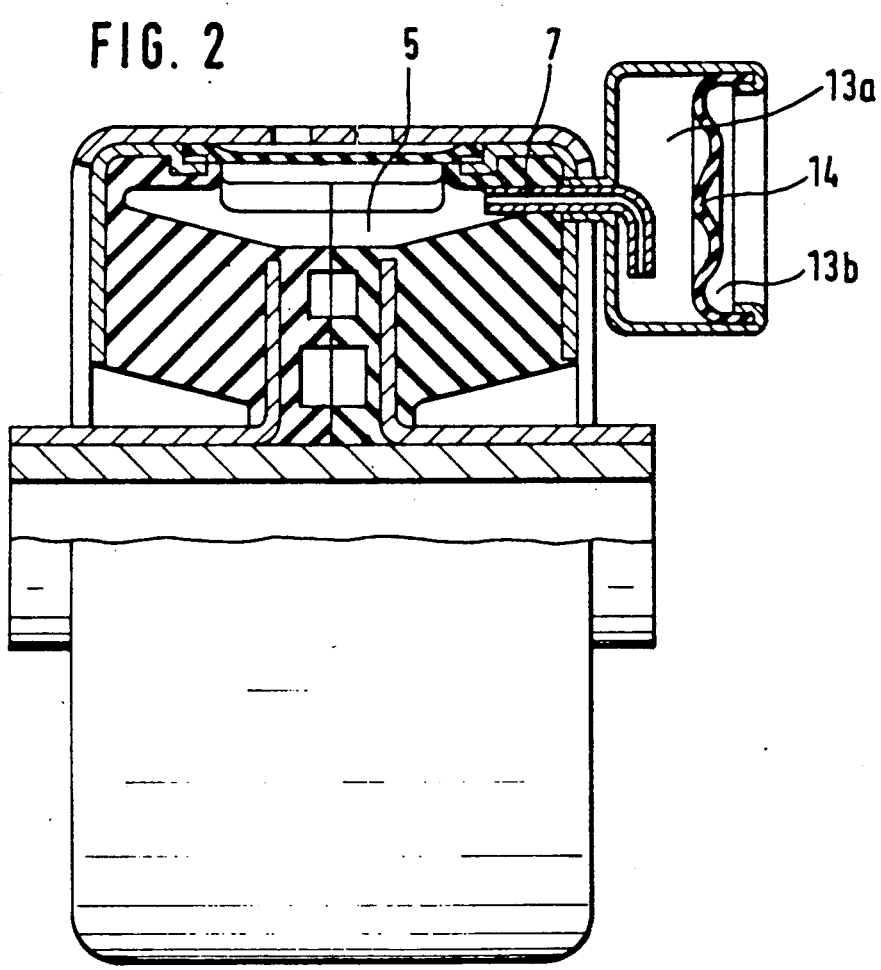
FIG. 2 is a cross-sectional view of a hydraulic dampening bearing with a separately attached equalizing chamber.

In FIG. 2, another embodiment of the invention is illustrated This bearing is, in principle, similar to the one shown in FIG. 1 with a difference being that equalizing chamber 13 is a separate component part. Chamber 5 again is connected to subchamber 13a, of equalizing chamber 13, by means of connection line 7. Equalizing membrane 14 is liquid tight and separates subchamber 13a from subchamber 13b. Equalizing chamber 13, in this case, is adapted so that the atmosphere may enter through the one-sided open end of equalizing chamber 13 and can directly impact equalizing membrane 14.

Figure 3:
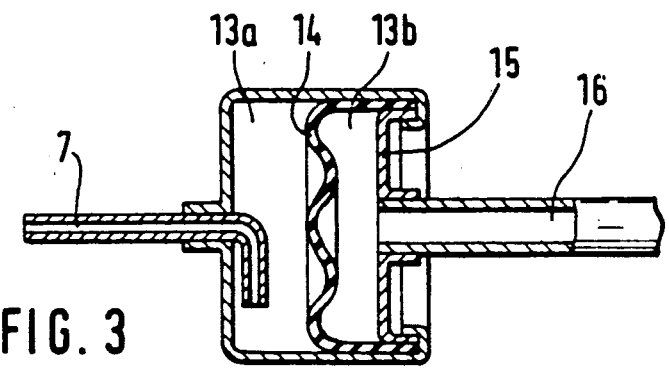
FIG. 3 is an enlarged fragmentary sectional view of an equalizing chamber of a hydraulic dampening bearing with a connection for a control.

In FIG. 3, equalizing chamber 13 is configured in such a fashion that subchamber 13b is closed off to the atmosphere by cover 15 having connection piece 16. Connection piece 16 may be connected to an external pressure source so that equalizing membrane 14 can be impacted with above atmospheric pressure, below atmospheric pressure or with atmospheric pressure thereby controlling the dampening and/or balancing action of the bearing.

The embodiments of the bearing shown in FIGS. 4–10 show greater detail of the bearings shown in FIGS. 1–3. However, for purposes of clarity, equalizing chamber 13 is not shown in FIGS. 4–10.

Figure 4:
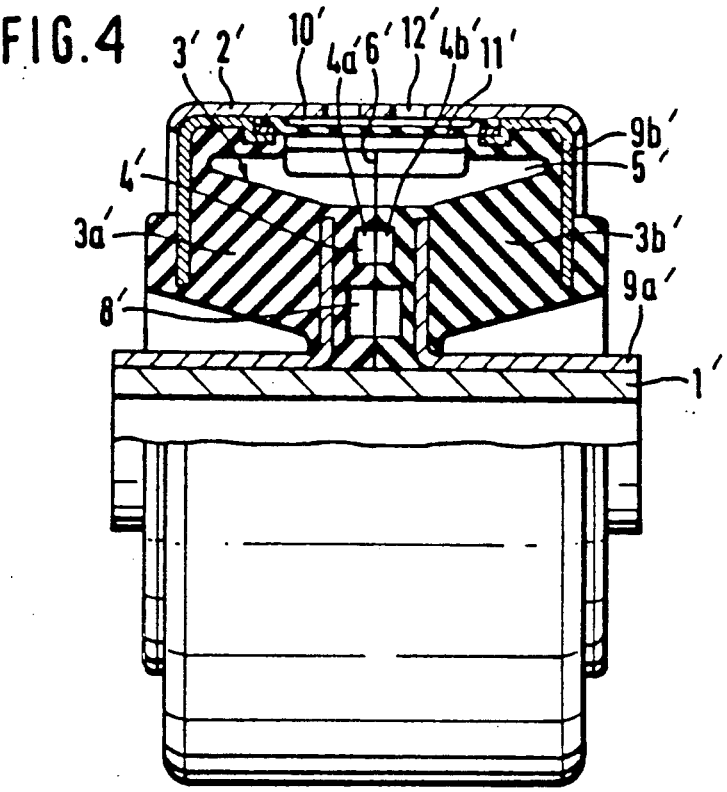
FIG. 4 is a side view, partially in section, of an internal structure of the preferred hydraulically dampening bearing, according to FIGS. 1 through 3, including various features of the invention.

As seen in FIG. 4, a preferred hydraulically dampening rubber, or elastomeric, bearing comprises an internal tube 1' and an external tube 2' located concentrically or eccentrically in relation to the internal tube 1' and at some distance therefrom. A rubber, or elastomeric, spring or part 3' is disposed between the internal tube 1' and the external tube 2' and includes chambers 5'. The chambers 5' are in the form of cavities in the rubber, or elastomeric, spring or part 3'. The chambers 5' are filled with a dampening fluid and are hydraulically connected to one another by means of a throttle passage 4'.

The rubber spring 3' is formed and composed of two identical shear elements 3a' and 3b', each of which include reinforcements 9a' and 9b' to facilitate easy assembly. The two shear elements 3a' and 3b' each include recesses 4a' and 4b' in the facing surfaces 6' thereof. When the elements 3a' and 3b' are assembled, the recesses 4a' and 4b' respectively combine to form each of two throttle passages 4', only one of which is seen in FIG. 4'. Additional recesses in the shear elements 3a' and 3b' combine, on assembly, to form a passage 8' which is designed as a bypass.

Figure 5:
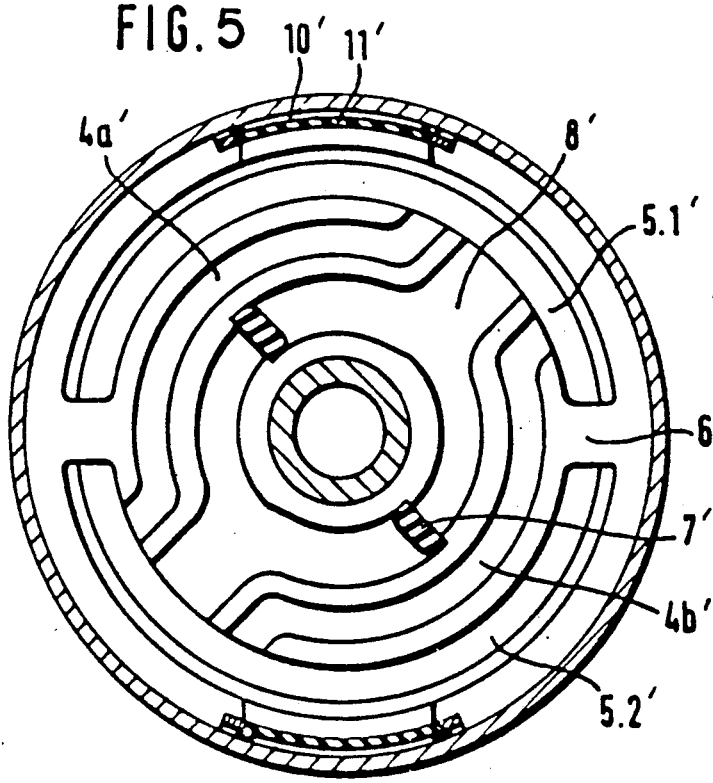
FIG. 5 is a cross-sectional view of the hydraulic dampening bearing of FIG. 4 which has two fluid chambers.

FIG. 5 shows a cross section of the rubber, or elastomeric, bearing shown in FIG. 4, as it would be generally seen along a plane adjacent the facing surfaces 6'. The rubber, or elastomeric, spring 3' is located between the internal tube 1' and the external tube 2'. In the preferred embodiment, the rubber, or elastomeric, spring 3' has a pair of chambers 5.1' and 5.2', which are connected to one another by means of two throttle passages 4' which are respectively located at the recesses 4a' and 4b'. Parallel to the throttle passages 4', at the recesses 4a' and 4b', there is a passage 8' in the form of a bypass.

A pair of valves 7', located in respective channels of the passage 8', are designed as check valves so that, at any given time, only one direction of flow through the passage 8' and one of its respective valves 7' is possible. As a result, bypass flow in the passage 8' from the chamber 5.1' into the chamber 5.2' is through one of the valves 7'. Bypass flow in the passage 8' from the chamber 5.2' in the reverse direction to chamber 5.1' is through the other valve 7'.

Figure 6:
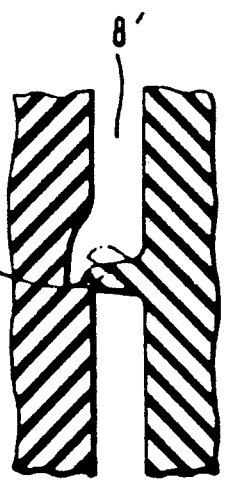
FIG. 6 is an enlarged fragmentary sectional view of a valve of the bypass of the hydraulic dampening bearing shown in FIG. 5.

FIG. 6 is an enlarged fragmentary sectional view of a portion of the rubber, or elastomeric, spring 3' including one of the valves 7'. Each valve 7' is respectively designed as an integral component of one of the shear elements 3a' and 3b'. An adjacent portion of the other shear element 3a' and 3b' serves as a stop, or seat, for each of the valves 7' to form a combined valve element which acts as a check valve.

FIG. 7' shows another embodiment of a rubber, or elastomeric, bearing of the invention including the rubber, or elastomeric, spring 3' which is disposed between an internal tube 1' and an external tube 2'. In this embodiment, the chambers 5.1', 5.2', 5.3' and 5.4' are distributed around the circumference of the rubber spring 3'. On the one hand, two of the chambers 5.1' and 5.2' are connected to one another by means of one throttle passage 4', and, on the other hand, the other two of the chambers 5.3' and 5.4' are connected to one another by means of another throttle passage 4'. The throttle passages 4' are located next to one another in separate parallel planes which are displaced from one another in a direction which is perpendicular to the plane of the drawing. For each of the throttle passages 4', there is a corresponding passage 8' disposed in its corresponding plane. Each passage 8' is connected, in the form of a bypass, to be parallel to its respective throttle passage 4'. Each passage 8' includes a valve 7' which is in the form of a rubber lip. The rubber lip is capable of closing the passage 8' but can be moved to either side as a function of the pressure conditions in the chambers connected thereby. When pressure oscillations with large amplitudes occur, the increased internal pressure in one of the chambers moves the rubber lip of the valve 7' to open the passage 8' as a bypass to the corresponding throttle passage 4'. Each of the chambers 5.1' and 5.2' in this embodiment is respectively equipped with a recess 10', which provides decoupling by means of a membrane 11' and ventilation hole 12'. For decoupling during operation, the highfrequency oscillations tend to move the membrane 11' without any dampening by the throttle passage 4'. Because the configuration includes four chambers 5.1', 5.2', 5.3' and 5.4', dampening is possible in all radial directions.

The embodiment illustrated in FIG. 8, in contrast to those shown in FIGS. 5 and 7, has three chambers 5.1', 5.2' and 5.3' which also tend to damp oscillations in all radial directions. The throttle passages 4' and the bypass passages 8' are again located in a common plane at the facing surfaces 6'. The chambers 5.1', 5.2' and 5.3' are all connected to one another with each of three valves 7' being capable of responding to pressure differentials in each pair of adjacent chambers 5.1', 5.2' and 5.3' in both pressure directions.

Figure 9:
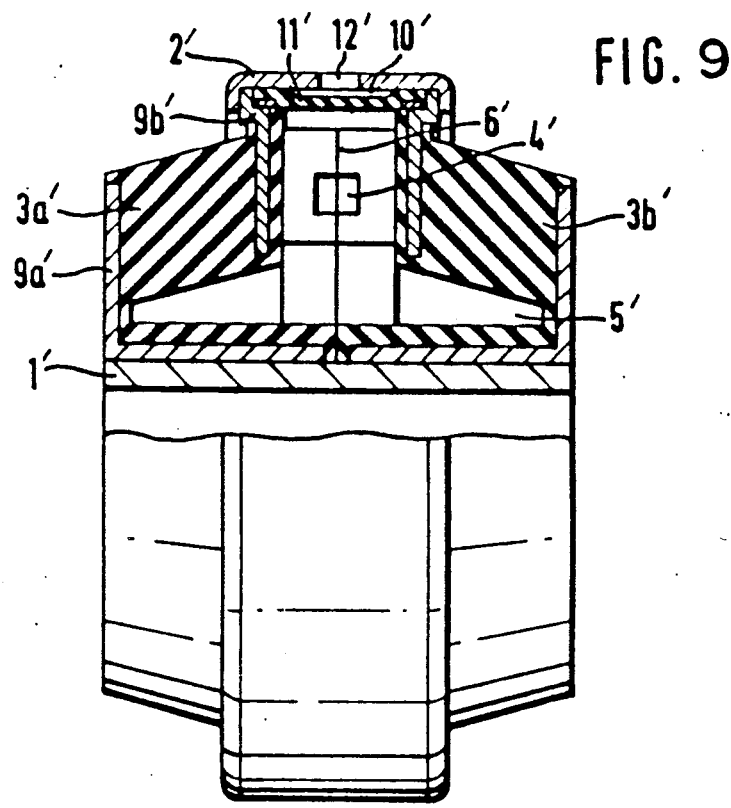
FIG. 9 is a side view, partially in section, of another internal embodiment of a hydraulic dampening or elastomeric bearing of FIGS. 1 through 3, including various features of the invention in cross section.
Figure 10:
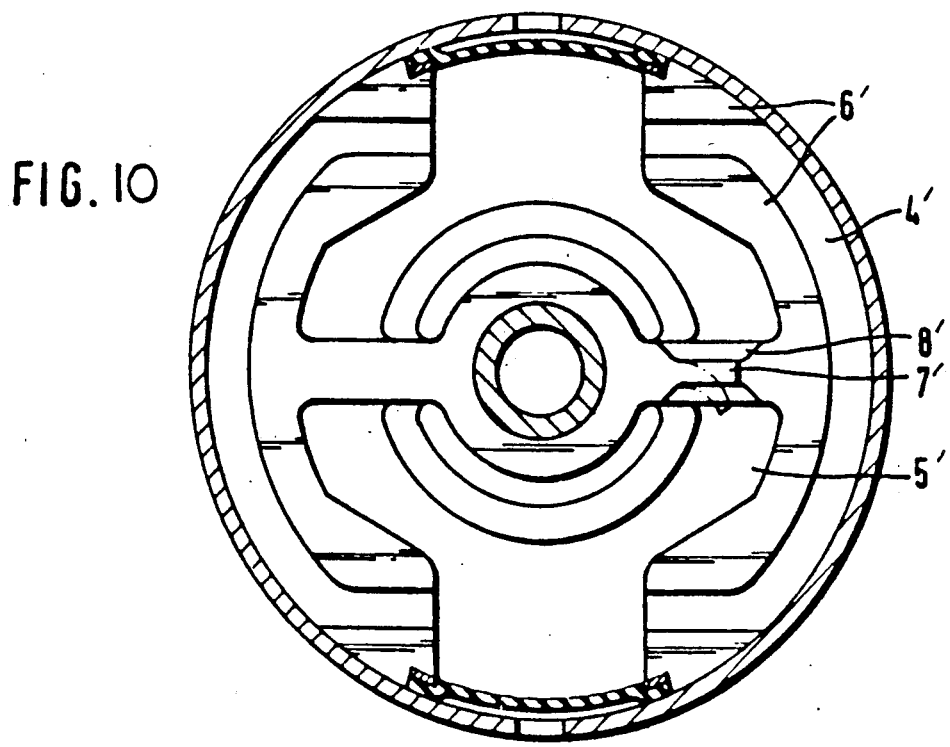
FIG. 10 is a cross-sectional view of the hydraulic dampening bearing shown in FIG. 9.

The alternative embodiment illustrated in FIGS. 9 and 10 includes a rubber, or elastomeric, bearing of the invention in which two chambers 5' are facing the internal tube 1' as the shear elements 3a' and 3b' extend radially outward therefrom. The design principle and the method of operation are the same as the examples illustrated in FIGS. 4 to 8. For dampening, the chambers 5' are provided with throttle passages 4' and with at least one passage 8' having a valve 7' and serving as a bypass to throttle passages 4'. With only two chambers 5', the dampening is limited to only one direction (vertically, as seen in FIG. 10). In this alternative configuration, the throttle passages 4' and the passage 8' are housed in the facing surfaces 6' of the two shear elements 3a' and 3b', which become functional after assembly. For decoupling, a recess 10' is vented outwardly through a ventilation hole 12'. The recess 10' is sealed from the chamber 5' by a membrane 11'.

The shear elements 3a' and 3b' each include an internal reinforcement 9a' and an external reinforcement 9b', so that, after assembly of the internal tube 1' and the external tube 2', the finished rubber bearing is formed.

All of the bearings shown in FIGS. 4–10 may employ equalizing chamber 13, if desired.

Patents relating to engine mount devices include U.S. Pat. No. 4,424,961, entitled "Engine Mounting For Suspending Engine Relative To Vehicle Structure" and U.S. Pat. No. 4,288,063, entitled "Rubber Elastic Engine Mounts Or Supports With Hydraulic Damping, Especially For Engine Suspensions In Motor Vehicles." Patents relating to vibration dampening devices include U.S. Pat. No. 4,781,361, entitled "Vibration-Preventing Rubber Device:" U.S. Pat. No 4,760,996, entitled "Damper and Isolator:" U.S. Pat. No. 4,753,421, entitled "Vibration-Preventing Rubber Device:" U.S. Pat. No. 4,721,291, entitled "Vibration-Preventing Rubber Device;" U.S. Pat. No. 4,244,240, entitled "Elastic Internal Flywheel Gimbal:" U.S. Pat. No. 4,215,842, entitled "Rubber Elastic Engine Mounts Or Supports With Hydraulic Damping:" European Laid Open Patent Appln. No. 02 34 966 and U.S. Pat. No. 4,690,389.

Such rubber bearings can comprise an internal tube, an external tube located some distance from the internal tube, and a rubber piece inserted therebetween. However, in the area of the chambers, the rubber part is outwardly designed only as a seal, and is thereby subjected to tensile forces in operation. This area cannot be used as a bearing spring, and is not capable of traveling great distances in the radial direction.

In summary, one aspect of the invention resides broadly in a hydraulically damping rubber bearing, comprising an internal tube, an external tube located at some distance from it, and a rubber spring inserted between them, which form chambers filled with damping fluid, connected hydraulically to one another by means of throttle passages, and which are externally sealed whereby the rubber spring is being utilized as both a load spring and sealing element, is characterized by the fact that at least one chamber 5 is connected to an equalizing chamber 13 by a connecting line 7, equalizing chamber 13 is divided into subchamber 13a containing damping fluid and subchamber 13b which is impacted by external force, via equalizing membrane 14.

Another aspect of the invention resides broadly in a rubber bearing according to claim 1 is characterized by the fact that the equalizing chamber 13 is integrated in the rubber bearing.

Yet another aspect of the invention resides broadly in a rubber bearing according to claim 1 is characterized by the fact that equalizing chamber 13 is developed into a separate component part.

A further aspect of the invention resides broadly in a rubber bearing according to claim 1 is characterized by the fact that equalizing membrane 14 can be impacted with above atmospheric pressure, below atmospheric pressure or atmospheric pressure.

A yet further aspect of the invention resides broadly in a rubber bearing according to claim 1 is characterized by the fact that subchamber 13b is open towards the atmosphere.

All of the patents, patent applications, and publications recited herein, if any, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

I claim:

1. Hydraulic dampening elastomeric bearing comprising:
    internal element means;
    external element means for being disposed around at least a portion of said internal element means and radially spaced therefrom;
    spring means for resiliently connecting said internal element means to said external element means;
    said spring means being disposed between said internal element means and said external element means;
    said spring means defining cavity means therein;
    equalizing chamber means for varying the hydraulic pressure in said cavity means;
    said equalizing chamber means comprising:
        first subchamber means in fluid communication with said cavity means;
        channel means for transferring fluid between said cavity means and said first subchamber means;
        said channel means being connected between said cavity means and said first subchamber means;
        said channel means being dimensioned to substantially prevent fluid transfer between said cavity means and said first subchamber means when a fluid pressure surge occurs within said cavity means;
        second subchamber means physically separated and fluidly sealed from said first subchamber means;
        sealing means positioned between said first subchamber means and said second subchamber means;
        said sealing means for physically separating and fluidly sealing said first subchamber means from said second subchamber means; and
        opening means defined by said second subchamber means for receiving a fluid pressure from a source which is external to said second subchamber means.

2. The bearing of claim 1, wherein:
    said second subchamber means is configured for receiving said fluid pressure from said opening means;
    said second subchamber means is configured to transfer said fluid pressure through said sealing means to said first subchamber means; and
    said first subchamber means is configured to vary said hydraulic pressure in said cavity means relative to said fluid pressure.

3. The bearing of claim 2, wherein said opening means is exposed to the atmosphere.

4. The bearing of claim 3, wherein said spring means comprises an elastomer.

5. The bearing of claim 2, wherein said opening means is for connection to a source other than atmospheric pressure.

6. The bearing of claim 5, wherein said spring means comprises an elastomer.

7. The bearing of claim 5, wherein said pressure is above atmospheric pressure.

8. The bearing of claim 7, wherein said spring means comprises an elastomer.

9. The bearing of claim 5, wherein said pressure is below atmospheric pressure.

10. The bearing of claim 9, wherein said spring means comprises an elastomer.

11. The bearing of claim 2, wherein said fluid is dampening fluid.

12. The bearing of claim 11, wherein said spring means comprises an elastomer.

13. The bearing of claim 2, wherein said equalizing chamber means is positioned between at least a portion of said internal element means and said external element means.

14. The bearing of claim 13, wherein said spring means comprises an elastomer.

15. The bearing of claim 2, wherein said equalizing chamber means is positioned external to said internal element means and said external element means.

16. The bearing of claim 15, wherein said spring means comprises an elastomer.

17. The bearing of claim 2, wherein said spring means comprises an elastomer.

18. The bearing of claim 1, wherein said spring means comprises an elastomer.

19. The bearing of claim 1, wherein said channel means is dimensioned to facilitate fluid transfer from said cavity means to said first subchamber means when the temperature of said bearing increases.

20. The bearing of claim 19, wherein said channel means is dimensioned to facilitate fluid transfer from said first subchamber means to said cavity means when the temperature of said bearing decreases.

21. The bearing of claim 20, wherein:
    said second subchamber means is configured to be impacted by an external force through said sealing means;
    said equalizing chamber means is intergral with said internal element means and said external element means; and
    said sealing means is configured to be impacted with above atmospheric pressure, below atmospheric pressure and atmospheric pressure.

22. The bearing of claim 20, wherein:
    said second subchamber means is configured to be impacted by an external force through said sealing means;
    said equalizing chamber means is a separate component from said internal element means and said external element means;
    said sealing means is configured to be impacted with atmospheric pressure; and
    said second subchamber means is open to the atmosphere.

* * * * *